US012732457B2

(12) United States Patent
Roweth et al.

(10) Patent No.: US 12,732,457 B2
(45) Date of Patent: Sep. 8, 2026

(54) FLEXIBLE VALIDATION OF SOURCE IDENTIFIERS

(71) Applicant: HEWLETT PACKARD ENTERPRISE DEVELOPMENT LP, Spring, TX (US)

(72) Inventors: Duncan Roweth, Bristol (GB); Keith D. Underwood, Spring, TX (US); Ian Ziemba, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 313 days.

(21) Appl. No.: 18/476,955

(22) Filed: Sep. 28, 2023

(65) Prior Publication Data

US 2025/0112859 A1 Apr. 3, 2025

(51) Int. Cl.

| | |
|---|---|
| ***G06F 15/173*** | (2006.01) |
| ***H04L 45/00*** | (2022.01) |
| ***H04L 45/748*** | (2022.01) |
| ***H04L 49/90*** | (2022.01) |

(52) U.S. Cl.

CPC .......... *H04L 45/566* (2013.01); *H04L 45/748* (2013.01); *H04L 49/9026* (2013.01)

(58) Field of Classification Search

CPC .. H04L 45/566; H04L 45/748; H04L 49/9026

USPC .......................................................... 709/238

See application file for complete search history.

(56) References Cited

U.S. PATENT DOCUMENTS

| | | | |
|---|---|---|---|
| 6,334,153 B2 | 12/2001 | Boucher et al. | |
| 6,724,762 B2 | 4/2004 | Garcia et al. | |
| 8,903,935 B2 | 12/2014 | Grant et al. | |
| 9,436,651 B2 | 9/2016 | Underwood et al. | |
| 2014/0237156 A1 | 8/2014 | Regula et al. | |
| 2015/0281126 A1 | 10/2015 | Regula et al. | |
| 2019/0042518 A1 | 2/2019 | Marolia et al. | |
| 2019/0044866 A1 * | 2/2019 | Chilikin | H04L 69/22 |
| 2020/0358721 A1 | 11/2020 | Rimmer et al. | |
| 2021/0119930 A1 | 4/2021 | Debbage et al. | |
| 2022/0124046 A1 | 4/2022 | Debbage | |

* cited by examiner

*Primary Examiner* — Vivek Srivastava
*Assistant Examiner* — Karina J Garcis-Ching
(74) *Attorney, Agent, or Firm* — Dickinson Wright

(57) ABSTRACT

Systems and methods are provided for validating an identifier using a dynamic matching scheme, including software-defined-matching or hardware-validated-matching. Software-defined-matching may determine whether two identifiers are logically the same when they are both generated by a software application and match each other, and hardware-validated-matching may determine whether the identifier provided by a message stamping process generated by a hardware component of the device matches a second identifier. The flexible validation process can allow the origin of the device to be trusted when the device is sending communications in the network, while detaching the trust from the user that is operating the trusted device or installing software (e.g., an operating system) on the device for temporary use. By disassociating the trust and independently verifying the device separate from the user operating the device, the communications sent and received by the system can be further trusted or distrusted accordingly.

20 Claims, 7 Drawing Sheets

FLEXIBLE VALIDATION OF SOURCE IDENTIFIERS

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

In traditional systems, network messages sent by source computers are matched to receive requests posted by receiver computers. The matching is performed using match bits and a source identifier in the transport layer of the message. The match bits are entirely under the control of the user software to be used part of a matching mechanism with traditional packet transmissions. These values are supplied by the sender/source and the receiver/target. If the source identifier used in a buffer for the receiver matches the identifier included in the message, the network message is added to the receiver's buffer. These messages may be provided by the sender device to the receiver device. In some instances, the source of the network message identifies itself. In some instances, the source of the network message may be identified by the source device, without the knowledge of the user that is operating the device. In some instances, the receiver needs to know whether the source identifier can be trusted. This can be problematic when the source device is used by multiple entities, including trusted entities and untrusted entities. Better security measures are needed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
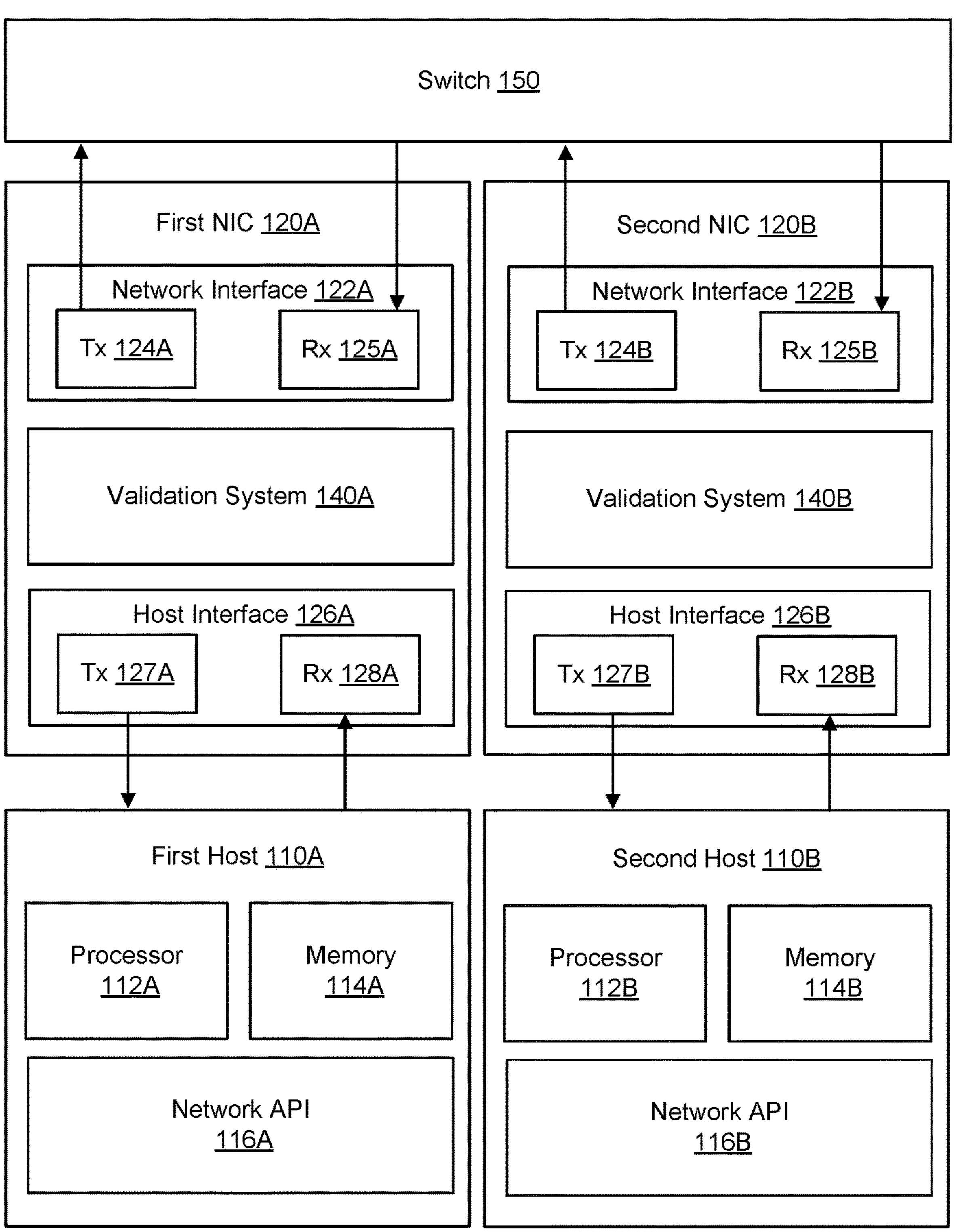
FIG. 1 illustrates a system implementing flexible validation in accordance with some embodiments of the disclosure.

The figures are not exhaustive and do not limit the present disclosure to the precise form disclosed.

DETAILED DESCRIPTION

One way to identify a user of a device is through a data signature. When the user is using a trusted device, the user may provide their data signature along with an identifier of the device. These combined data security mechanisms can certify that the device corresponds with an authentic piece of hardware that is permitted to operate in the communication network, and that the user operating the device has permission to access the device message buffer that receives the network message. In some examples, these network messages are created in a user space and message/buffer matching is performed using information provided by the user. However, the information may be fraudulently provided by a user and should not be trusted by either the sender device or receiver device. Traditional message retrieval procedures like, packet switching, can automatically accept information from untrusted devices or users. For example, in traditional packet switching, the data is grouped into packets with a header and a payload that are transmitted over the network. The data in the header is used by networking hardware to direct the packet to its destination, where the payload is extracted and used by an operating system or application software.

This technical problem may conventionally be solved by installing trusted software at the device (e.g., agent or operating system) and sending the network message using this trusted software. However, this requires the device to download, install, and maintain software. Also, when the device connects to a data center as a client device, the data center must assume a level of trust in the client device that can be unfounded. For example, the client device may be a compute node that is rented to a customer and the customer may be unknown and untrusted, causing the client device to become a host device for the customer. Also, traditional systems cause technical issues when the network messages are transmitted via the operating system of the client/host device through the downloaded and trusted software, the operating system dedicates resources to processing and transmitting these messages through the trusted software instead of performing other operations. The performance of the operating system (and client/host device overall) can be reduced.

Examples of the system described herein may forego requiring host devices to download trusted software or utilize operating system resources in transmitting additional messages, and instead implement an application programming interface (API) to standardize formats of transmitted messages and increase data security. This process may correspond with a matching scheme at a source device and a confirmation scheme at the target device that can help validate identifiers in the message. By implementing a matching scheme and confirmation scheme, the system may remove reliance on the operating system altogether to help validate source identifiers dynamically. For example, the system can dynamically determine whether software-defined-matching or hardware-validated-matching was used to generate the identifier at the source device. The particular matching scheme may be utilized when generating the identifier/message and a confirmation scheme may be implemented by the target device when receiving the transmitted message to confirm the type of matching scheme that was used in generating the message.

Various matching schemes may be implemented. Software-defined-matching may correspond with a software implementation that determines whether two identifiers are logically the same when they are both generated by a software application and match each other, and hardware-validated-matching may comprise a software implementation that determines whether the identifier provided by a message stamping process generated by a hardware component of the device matches a second identifier. The message stamping process may be implemented by a NIC in a trusted hardware device. This allows the origin of the device with the NIC to be trusted when the device is sending communications in the network, while detaching the trust from the user that is operating the trusted device or installing software (e.g., an operating system) on it for temporary use.

The source identifier may uniquely identify a source of the message, including an identification of the host device hardware or software associated with a customer that installs their own software on the host device. In other examples, the format of the source identifier can correspond with the format required by the network API of the host device, including a length or character limitation of the identifier. An illustrative example of this API corresponds with a format, including libfabric with a reference to openfabrics, kfabric, or Portals. In some examples, the format may correspond with a framework that helps to export high-performance networking services to applications. In some examples, the format may correspond with an interface between software and fabric hardware (e.g., at the kernel). In some examples, the format for the API is associated with a framework or abstract of the API.

The message may also comprise a matching scheme selection bit or bits. The matching scheme selection bit or bits may exist separately from the source identifier to dynamically determine whether software-defined-matching or hardware-validated-matching was used by the source device. The source device may add the matching scheme selection bit or bits and the source identifier (generated by software-defined-matching or hardware-validated-matching) to the message, which may be analyzed by the target device to implement improved security within the system.

Technical improvements are realized throughout the disclosure. For example, the system may allow a dynamically-defined implementation of software-defined-matching or hardware-validated-matching, where hardware-validated-matching relies on the NIC that is configured to stamp the pre-defined source identifier for the outgoing messages and software-defined-matching uses for example the matching scheme selection bit or bits to identify the matching scheme. By disassociating the trust and independently verifying the device separate from the user operating the device, the communications sent and received by the client device can be further trusted or distrusted accordingly.

FIG. 1 illustrates a system implementing flexible validation of source identifiers in accordance with some embodiments of the disclosure. In this example, messages corresponding with a set of data packets may be transmitted and received at various devices, including from first host 110A to first NIC 120A to switch 150 to second NIC 120B to second host 110B. Validation system 140 may be implemented at each NIC 120 to help manage flexible validation of source identifiers from host devices 110. Switch 150 is configured to receive and route messages in accordance with a particular message format and reject messages that are not formatted correctly.

Host devices 110 (illustrated as first host 110A and second host 110B) are configured to hardware and software capabilities to customers. In some examples, host devices 110 may be rented or otherwise used temporarily by customers, including first host device 110A providing rented hardware capabilities for first customer and second host device 110B provides rented hardware capabilities for second customer. Customers or system administrators of the data center may load software to host devices 110, including operating systems or other software functionality.

Host devices 110 comprise processor 112 (illustrated as first processor 112A in first host 110A and second processor 112B in second host 110B), memory 114 (illustrated as first memory 114A in first host 110A and second memory 114B in second host 110B), and network application programming interface (API) 116 (illustrated as first network API 116A in first host 110A and second network API 116B in second host 110B). Host devices 110 are configured as a sender device and a receiver device to transmit and receive messages, respectively.

Processor 112 may comprise a general-purpose or special-purpose processing engine such as, for example, a microprocessor, controller, or other control logic. Processor 112 may be connected to a bus, although any communication medium can be used to facilitate interaction with host device 110 via network API 116 to communicate externally to NIC 120 and other devices (e.g., switch 150 or the other host device).

Memory 114 may comprise random-access memory (RAM) or other dynamic memory for storing information and instructions to be executed by processor 112. Memory 114 might also be used for storing temporary variables or other intermediate information during execution of instructions to be executed by processor 112. Memory 114 may also comprise a read only memory ("ROM") or other static storage device coupled to a bus for storing static information and instructions for processor 112.

Network API 116 is configured to provide a standardized software interface (e.g., libfabric) that processor 112 at host device 110 can use to send and receive messages. The messages may be generated, sent, and received using NIC commands, as described below.

Figure 2:
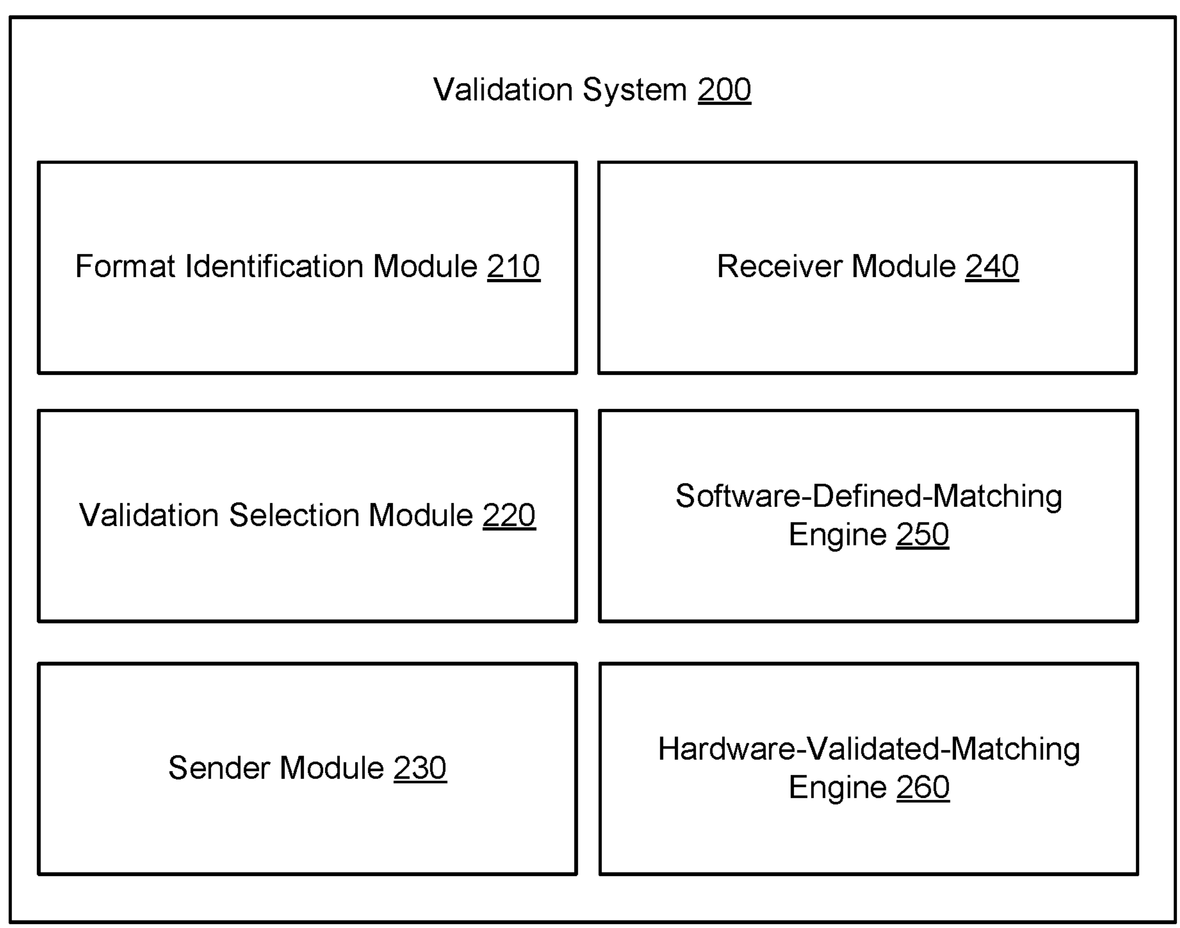
FIG. 2 illustrates a validation system of a NIC in accordance with some embodiments of the disclosure.

NIC 120 (illustrated as first NIC 120A and second NIC 120B) is a Network Interface Card (NIC) that may embed an instance of validation system 140, further illustrated in FIG. 2. NIC 120 is configured to perform various operations associated with transmitting and receiving communications between host devices 110, and also be configured to implement hardware-validated-matching process to stamp the identifier described herein (via validation system 140).

NIC 120 comprises network interface 122 (illustrated as first network interface 122A in first NIC 120A and second network interface 122B in second NIC 120B), host interface 126 (illustrated as first host interface 126A in first NIC 120A and second host interface 126B in second NIC 120B), and validation system 140 (illustrated as first validation system 140A in first NIC 120A and second validation system 140B in second NIC 120B). NIC 120 enables communication of each host device 110 to communicate via the network using host interface 126 (e.g., an interface for connecting to the host processor) and high-speed network interface 122.

In some examples, host interface 126 can be a peripheral component interconnect (PCI) or a peripheral component interconnect express (PCIe) interface. Host interface 126 can be coupled to a host via a host connection, which can include N (e.g., N can be 16 in some chips) PCIe Gen 4 lanes capable of operating at signaling rates up to 25 Gbps per lane. Host interface 126 can facilitate a high-speed network connection. Host interface 126 can operate at aggregate rates of either 100 Gbps or 200 Gbps using M (e.g., M can be 4 in some chips) full-duplex serial lanes. Each of the M lanes can operate at 25 Gbps or 50 Gbps based on non-return-to-zero (NRZ) modulation or pulse amplitude modulation 4 (PAM4), respectively. High-speed network interface 122 can support the Institute of Electrical and Electronics Engineers (IEEE) 802.3 Ethernet-based protocols as well as an enhanced frame format that provides support for higher rates of small messages.

NIC 120 can support one or more of: point-to-point message passing based on Message Passing Interface (MPI), remote memory access (RMA) operations, offloading and progression of bulk data collective operations, and Ethernet packet processing. When host device 110 issues an MPI message, NIC 120 can match the corresponding message type. Furthermore, NIC 120 can implement both eager protocol and rendezvous protocol for MPI, thereby offloading the corresponding operations from host device 110.

Furthermore, the RMA operations supported by NIC 120 can include PUT, GET, and Atomic Memory Operations (AMO). NIC 120 can provide reliable transport by providing connection-based error detection and retry mechanism for ordered operations that may manipulate a target state. The hardware of NIC 120 can maintain the state necessary for the retry mechanism.

NIC 120 can facilitate triggered operations, a general-purpose mechanism for offloading, and progression of dependent sequences of operations, such as bulk data collectives. NIC 120 can support network API 116 (e.g., libfabric API) that facilitates network communication services for host device 110. NIC 120 can also support a low-level network programming interface, such as Portals API (not shown). In addition, NIC 120 can provide efficient Ethernet packet processing.

Validation system 140 is configured to validate messages transmitted from a sender device (first host 110A) to a receiving device (second host 110B), including for example, to authenticate the source of the message. Validation system 140 can validate the source of the data packet using the source identifier.

An example of transmitting and receiving a set of data packets as a message via the network using components described in FIG. 1 is provided for illustrative purposes. For example, an egress port of first host 110A can transmit a data packet via ingress port 128A of host interface 126A at first NIC 120A. Validation system 140A of first NIC 120A may validate the data packet. The egress port of the network interface 122A of first NIC 120A can inject the data packet to the network via switch 150. The data packet can be received from the network via ingress port 125B of network interface 122B at second NIC 120B. Validation system 140B of second NIC 120B may validate the data packet. An egress port of host interface 126B can transmit the data packet to second host 110B.

FIG. 2 illustrates a validation system of a NIC in accordance with some embodiments of the disclosure. Validation system 200 may be an example of an implementation of first validation system 140A of first NIC 120A and second validation system 140B of second NIC 120B.

Validation system 200 may comprise machine readable media with one or more interfaces, circuits, and modules for implementing the functionality of validation system 200 discussed herein. For example, machine readable media may carry one or more sequences of one or more instructions processor for execution. Such instructions embodied on machine readable media may enable validation system 200 to perform features or functions of the disclosed technology. For example, the interfaces, circuits, and modules of machine readable media may comprise, for example, format identification module 210, validation selection module 220, sender module 230, receiver module 240, software-defined-matching engine 250, and hardware-validated-matching engine 260.

Format identification module 210 is configured to receive a first format for an application programming interface (API), including network API 116 at host device 110 in FIG. 1. For example, a host device may select a system environment to implement a particular scheme of source identifier verification. The system environment may vary based on the intended use of the environment by the host/customer.

Format identification module 210 is also configured to generate an identifier, where a format of the identifier complies with the format of the message. NIC 200 associated with the sender host device can determine a source identifier and matching scheme selection bit or bits to include with transmitted messages, whereas some traditional systems may limit the identifier to a MAC address of the host device or other pre-defined identifier. This is a technical solution to technical problems that involve the identification of the user of a computer, since the source identifier may help identify the difference between two users that are working on the same host device, whereas a MAC address would only identify the host device without distinguishing the user/operator of the device at a particular time.

The format of the source identifier may vary by implementation. For example, the format may limit the incoming message to include a 32-bit identifier. The network API may follow the pre-defined format to define an identifier. A portion of the message format may be reserved to identify the type of matching scheme to implement (e.g., software-defined-matching or hardware-validated-matching) as the matching scheme selection bit or bits and the remaining portion of the message may be reserved for the source identifier associated with the source client device. In other examples, the source identifier is chosen by the customer operating the host device or administrative user of the host device, including by utilizing a logical endpoint identifier (e.g., IP address) and PID, a physical endpoint identifier (e.g., MAC address or network address) and PID, a token that is unique within the scope of the application or service, and an identifier generated using information provided by user software to look up a source identifier or token. In some examples, like in software-defined-matching, the API may define the format of the source identifier. In another example, the sender device or receiver device may be numbered (e.g., zero to N minus one) and software may determine a value for each of the devices. The receiver device may identify the value that is reserved for the sender/receiver communication and accept communications when the communications from the sender device that include the value.

The source identifier may be stored at the control plane as part of a "communication profile", which may correspond with a NIC data structure storing a protected state relating to the client. The device can support multiple communication profiles and the system itself can control whether the communication profile can be programmed by the operating system, user of the host device, or remotely by a management system of a data center.

In some examples, the use of the source identifier can also be implemented with particular operating systems (OS). For example, a Trusted OS may store a certificate or signature of complying with government requirements. When the OS is trusted, it can program the source identifier with a communication profile that is accessed when the device is booted or its driver is loaded. The management system may permit read-only or read/write access to the communication profile (e.g., the operating system can set the source identifier by writing to the communication profile). When the OS is not trusted, i.e., when a trusted data center is providing hardware as bare metal absent corresponding trusted software, any write access to the communication profile may be prohibited and the management system programs the source identifier for each NIC/host device.

In some examples, the format of the source identifier may be partitioned into sub portions that the host devices can use to identify the type of matching scheme to implement in this environment, as further described with validation selection module 220. For example, the source identifier may comprise the matching scheme selection bit or bits and the identifier (e.g., associated with the transport layer of the device) that is supplied in a user space by the sender and the receiver, such that their combined length complies with the format of the message. In other examples, the matching scheme selection bit or bits may be reserved to identify the type of matching scheme to implement (e.g., software-defined-matching or hardware-validated-matching) and the remaining bits may be reserved for the source identifier that is generated by software-defined-matching or hardware-validated-matching.

Validation selection module 220 is configured to determine the type of matching scheme to be used in the transmission. In some examples, the matching scheme may be dynamically determined to use software-defined-matching or hardware-validated-matching. When the source identifier is included with a message, the message may comprise the matching scheme selection bit or bits and source identifier in separate fields, or the source identifier may comprise both the identifier and the matching-scheme selection bit or bits. In either example, the matching scheme selection bit or bits may be used to identify whether software-defined-matching or hardware-validated-matching are incorporated with the pre-defined data format.

Validation selection module 220 is also configured to generate a message that includes a matching scheme selection bit or bits identifying whether software-defined-matching or hardware-validated-matching is implemented, as well as the identifier associated with the source of the message (e.g., host device 110).

In some examples, a user operating host device 110 may select the matching scheme from a user interface that identifies the trusted or untrusted environment offered to the customer via host device 110, and the selection may be transmitted to the corresponding NIC to be analyzed and implemented by validation selection module 220. The customer may load an operating system to host device 110 to a trusted host device to rely on software-defined-matching. In other examples, the system may default to a zero-trust environment that utilizes host device 110 that implements hardware-validated-matching rather than trusting access to a communication profile that stores the identifier.

Sender module 230 is configured to receive a message from a sender host device (first host device 110A) and identify a switch (switch 150 in FIG. 1) for transmitting the message to a particular receiver host device. Sender module 230 may send the message.

Receiver module 240 is configured to receive a message from a switch (switch 150) and identify a receiver host device (second host device 110B) to transmit the message. As an illustrative example, first host device 110A may act as a sender of the message and utilize sender module 230 for the particular message, while second host device 110B may act as a receiver of the message and utilize receiver module 240 for the particular message.

Receiver module 240 may utilize target side buffers that accept the message transmission based on source identifier and traditional packet switching match bits. The message is matched to a buffer at the receiver device that receives the message when the source identifier in the buffer matches the source identifier carried in the message.

Software-defined-matching engine 250 is configured to reserve a subset of the source identifier bits to define an identifier that will be matched between messages sent by the sender host device (e.g., first host device 110A). For example, as discussed herein with software-defined-matching, the identifier format may be defined by network API 116 at host device 110 for incoming and outgoing messages.

The source identifier may be determined through various methods. For example, the sender device or receiver device may be numbered (e.g., zero to N minus one) and software-defined-matching engine 250 may determine a value for each of the host devices. In other examples, the source identifier is chosen by a user, including by utilizing a logical endpoint identifier (e.g., IP address) and process identifier (PID), an endpoint identifier (e.g., MAC address or network address) and PID, a token that is unique within the scope of the application or service, and a identifier generated using information provided by user software to look up a source identifier or token. The receiver device may identify the value that is reserved for the sender/receiver communication and accept communications when the communications from the sender device that include the value.

Hardware-validated-matching engine 260 is configured to generate a message that includes a matching scheme identifier bit or bits identifying whether software-defined-matching or hardware-validated-matching is implemented, as well as the identifier associated with the source of the message (e.g., host device 110). The identifier may comprise a hardware-verified bit, a process identifier (PID), and an endpoint identifier (NID).

In hardware-validated-matching, hardware-validated-matching engine 260 stamps a pre-defined value as the source identifier for all outgoing messages. NIC 200, using hardware-validated-matching engine 260, is configured to stamp a message with the source identifier. The stamping process may be associated with a minimum trust that the device transmitting the communications is a trusted device, without also trusting the user operating the device or the software running on the device. In some examples, the message stamping process may be configured to implement control plane functionality to stamp the source identifier on the messages. Host devices may be incapable of implementing the message stamping process, even if the user escalates administrative privileges or control functionality in the local operating system.

The control plane of the sender device may store a communication profile that includes the source identifier. The communication profile may not be accessible by the guest operating system of the client device or the user operating the device. The communication profile may store the identifier associated with hardware-validated-matching, and when the hardware-validated-matching is implemented, the communication profile may not be accessed.

The data center system may rely on the message stamping process performed by hardware-validated-matching engine 260, which can render the communication profile unnecessary at the hardware-validated-matching phase. In other words, some examples of the data center system may store the full identifier in a communication profile (e.g., 32 bits including one bit for the software-defined-matching/hardware-validated-matching profile and 31 bits of the identifier), and some examples of the data center system may store the full identifier in the NIC and the message stamping process may add the identifier during the hardware-validated-matching phase.

In hardware-validated-matching, the NIC associated with the sender device stamps a pre-defined value as the identifier for outgoing messages. The hardware component may be embedded with sender device when the device is manufactured. In some examples, the NIC may be associated with a minimum trust that the device transmitting the communications is a trusted device, without also trusting the user operating the host device or the software running on the host device.

The message stamping process may stamp the source identifier to the outgoing messages as part of the control plane functionality of the NIC. The message stamping process may be implemented only on previously trusted types of hardware components like the NIC. Host-side software may be incapable of implementing the message stamping process, even if the user escalates administrative privileges or control functionality in the local operating system. In some examples, the control plane functionality of the NIC can perform other operations, including limiting the use of traffic classes, adding traffic in an overlay network, or applying access control rules.

In practice, when the receiver device receives the message, the receiver device reviews the matching scheme selection bit or bits that was generated based on a particular matching scheme, for example, to determine the corresponding confirmation scheme to implement (e.g., software-defined-matching or hardware-validated-matching) to help authenticate the source of the message. Other bits may be initially reviewed without diverting from the essence of the disclosure. The remaining bits may be reviewed to determine the source identifier of the sender device. The NIC associated with the receiver device implements the corresponding procedure associated with the confirmation scheme and determines whether the message both originates from a particular user and sender device, or whether the message originates from a different trusted/untrusted sender device.

In some examples, the functionality of software-defined-matching engine 250 and hardware-validated-matching engine 260 may be combined to provide a particular matching scheme selection mechanism (using the matching scheme selection bit or bits added to the message) and hardware stamp of the pre-defined identifier to form a hierarchy of trust that may increase the security of transmitted messages in the system. In some examples, the hierarchy may be determined by the API of the data center system and not permanently forged with the devices, since various devices in the communication path are providing verification for the authenticity of the message based on the pre-defined format. Additionally, by using hardware-validated-matching, the hierarchy of trust implemented by the system may not need to rely on a trusted operating system of a user device, the software application of the user device (e.g., kernel driver or sender's operating system), or the identifier itself. Additionally, the system may support multiple communication profiles or equivalent means of storing a control plane state per device/NIC to allow different applications or services to identify themselves in different ways without imposing additional processing burden on the sending device.

Figure 3:
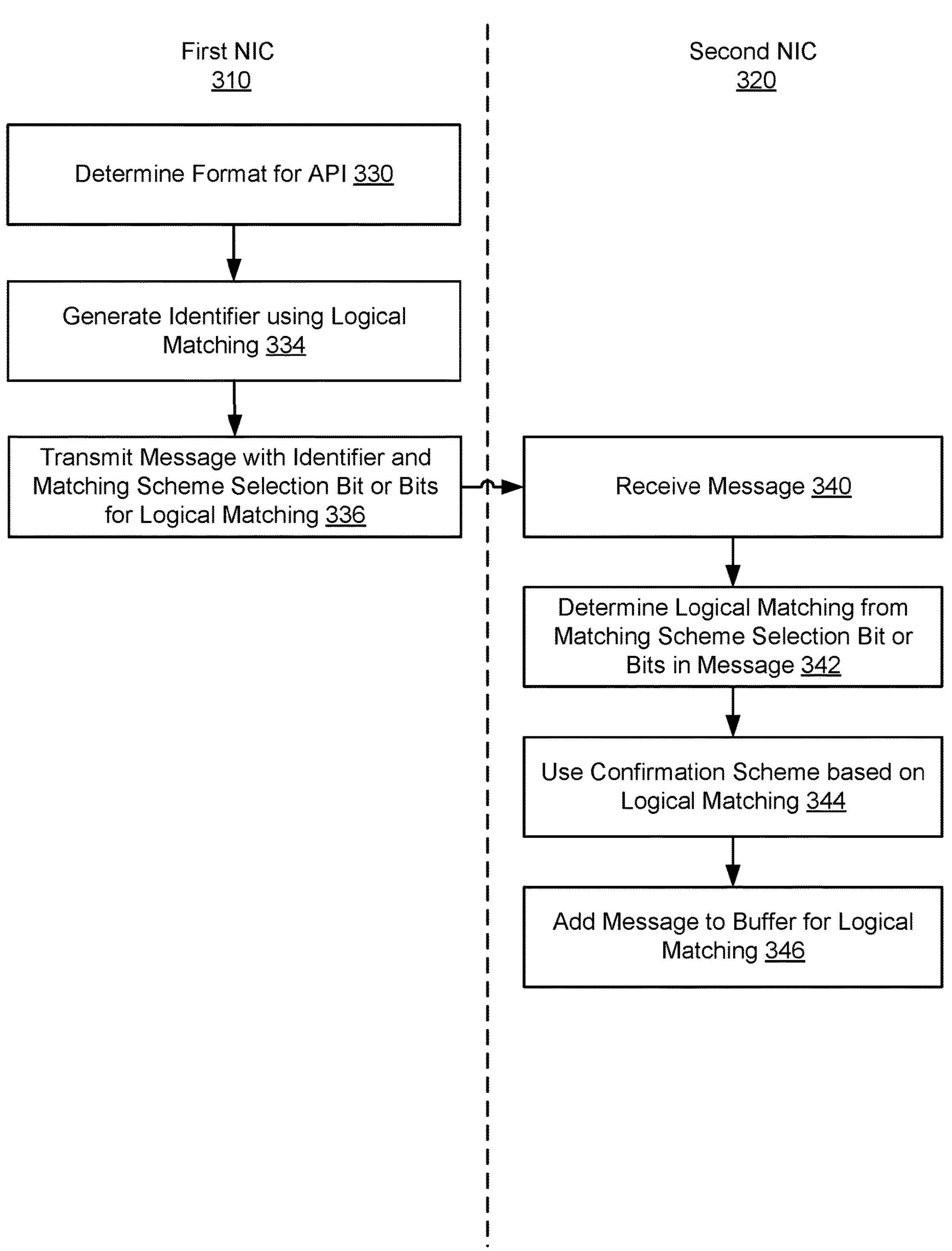
FIG. 3 is an example process for dynamically validating a source identifier and adding a corresponding message to a buffer at a receiver device in accordance with some embodiments of the disclosure.

FIG. 3 illustrates a validation process in a second system environment in accordance with some embodiments of the disclosure. In this example, first NIC 310 and second NIC 320 illustrated in FIG. 3 may correspond with first NIC at client device 130A and second NIC at client device 130B illustrated in FIG. 1, respectively.

At block 330, first NIC 310 may determine a format of the API. For example, the format of the message accepted by the API may be pre-determined to operate within the constraints of an existing API. In other examples, the format of the source identifier can correspond with the format required by the network API of the host device, including a length or character limitation of the identifier. The format may be associated with a framework or abstract of the API, or include particular formats like libfabric, kfabric, or Portals.

In some examples, first NIC 310 may access a communication profile. This is at least one optional step of the process. For example, the logical matching scheme may not access the communication profile. Instead, the system may select the logical matching scheme and use its own source identifier rather than any identifier stored with the communication profile. The NIC of the source device may determine that the logical matching scheme is selected and does not interfere with contents of the communication profile.

In some examples, the communication profile may be stored in the NIC associated with the first NIC 310 and comprise a source identifier associated with first NIC 310. The identifier may comply with the format required by the API and be limited to a particular length (e.g., 32-bit). In some examples, the control plane of first NIC 310 may store the identifier in the communication profile. By limiting access to the communication profile by the control plane, the communication profile may not be accessible by the guest operating system of the client device or the user operating the device.

At block 334, first NIC 310 may generate the identifier using software-defined-matching. Software-defined-matching may generate the identifier using software to determine a logical endpoint identifier (e.g., IP address) and PID, a physical endpoint identifier (e.g., MAC address or network address) and PID, a token that is unique within the scope of the application or service, or an identifier generated using information provided by user software to look up a token associated with first host device 310.

At block 336, first NIC 310 may transmit the identifier with a matching scheme selection bit or bits in a message to second NIC 320. The match bit may identify software-defined-matching as the confirmation scheme to be used by the receiver in a reserved portion of the identifier.

At block 340, second NIC 320 may receive the message. A temporary buffer may receive and store the message at second NIC 320. In some examples, packets of the messages are held in temporary storage within the NIC while the system determines the matching scheme to be used and carry out the matching.

At block 342, second NIC 320 may determine that software-defined-matching was used by first NIC 310 to generate the identifier or message, based on the matching scheme selecting bit or bits in the message. For example, second NIC 320 can determine that the matching scheme selection bit or bits is included with transmitted messages, whereas some traditional systems may limit the identifier to a MAC address of the host device or other pre-defined identifier. A portion of the message format may be reserved to identify the type of matching scheme to implement (e.g., software-defined-matching or hardware-validated-matching) as the matching scheme selection bit or bits and the remaining portion of the message may be reserved for the source identifier associated with the source client device. Second NIC 320 may identify the format of the message that includes the matching scheme selection bit or bits, as to confirm that that message is in a format that is reserved for the communications from trusted sources. Second NIC 320 may accept communications when the message includes the value.

At block 344, second NIC 320 may use a confirmation scheme based on the identification that software-defined-matching was used in generating the identifier. For example, the confirmation scheme may determine whether the message both originates from a particular user and sender device, or whether the message originates from a different trusted/untrusted sender device by confirming that the matching scheme selection bit or bits is in the correct location/format and also that the format/value for the source identifier matches the device that transmitted the message. The message may be rejected or passed to higher level software. The higher level software can receive the message when the source of the message cannot be validated. For example, in a client-server application, the server may behave differently according to whether or not it can trust the source of the message.

At block 346, second NIC 320 may add the message to the buffer at second NIC 320 for software-defined-matching. For example, the data packet of the message is added to a buffer at second NIC 320 (e.g., for processing) when the source identifier in the buffer matches the source identifier carried in the message.

Figure 4:
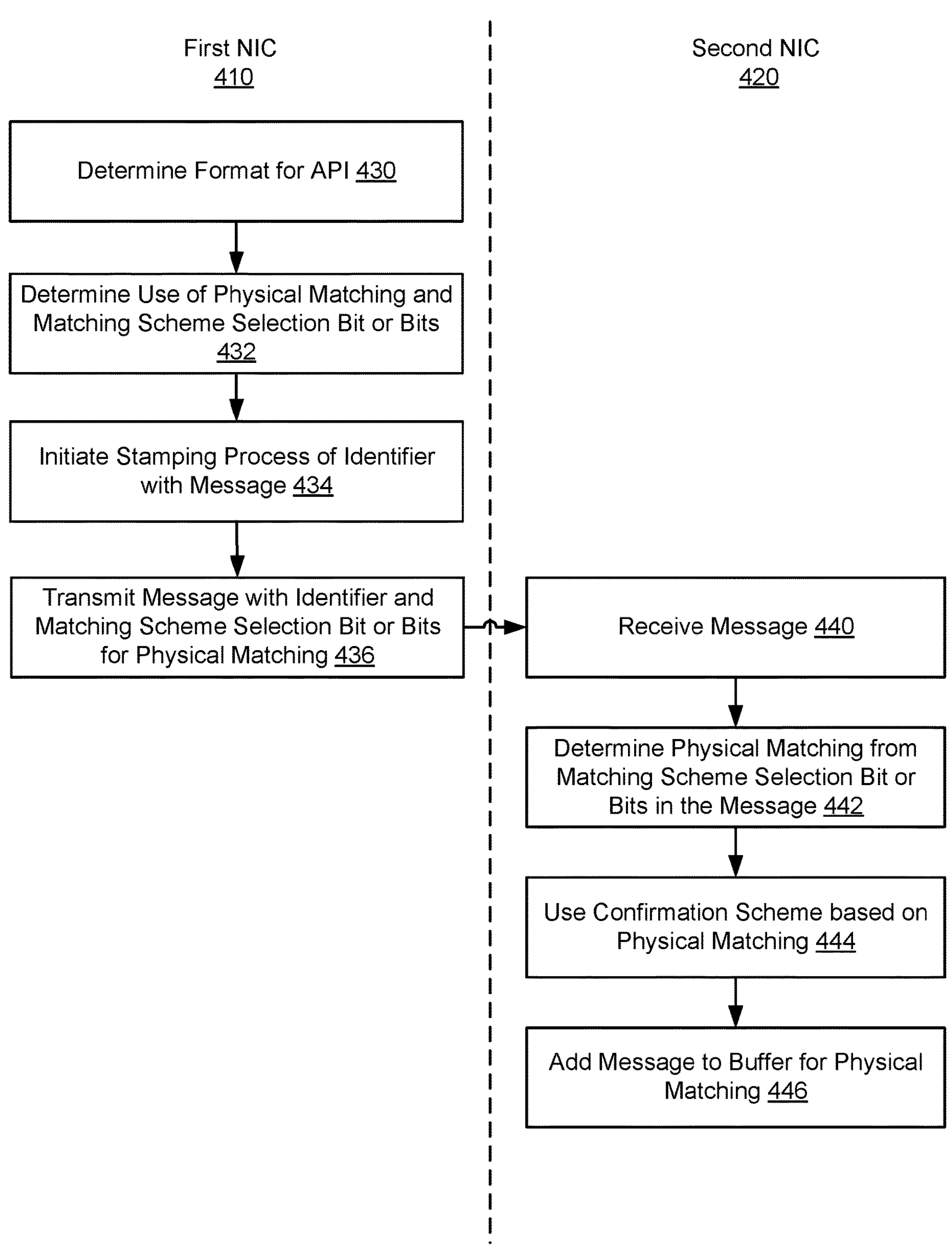
FIG. 4 is an example process for dynamically validating a source identifier and adding a corresponding message to a buffer at a receiver device in accordance with some embodiments of the disclosure.

FIG. 4 illustrates a validation process in a third system environment in accordance with some embodiments of the disclosure. In this example, first NIC 410 and second NIC 420 illustrated in FIG. 4 may correspond with first NIC at device 130A and second NIC at device 130B illustrated in FIG. 1, respectively.

At block 430, first NIC 410 may determine a format of the API, similar to block 330.

At block 432, first NIC 410 may determine the use of hardware-validated-matching and a match bit. For example, hardware-validated-matching relies on the configuration of first NIC 410 to stamp the pre-defined source identifier on the outgoing message, and also to add the match bit separately from the source identifier to identify that hardware-validated-matching was used. The source device may add the match bit and the source identifier to the message. Once hardware-validated-matching is identified for first NIC 410, first NIC 410 may determine the source identifier based on a message stamping process generated by a hardware component of the device. First NIC 410 may determine to identify the source of its messages to be hardware-validated-matching or software-defined-matching, or use a default determination (e.g., configured to always use hardware-validation).

At block 434, first NIC 410 may initiate a message stamping process of the identifier with the message pursuant to the hardware-validated-matching process. The message stamping process may be implemented by the NIC associated with the first NIC 410 to stamp a pre-defined value as the identifier for all incoming and outgoing messages. For example, the stamping process may stamp a pre-defined value that is stored in a secure location on first NIC 410 as the source identifier for all outgoing messages. The stamping process may be associated with a minimum trust that the device transmitting the communications is a trusted device (e.g., using first NIC 410 that has access to the pre-defined value), without also trusting the user operating the device or the software running on the device.

In some examples, the message stamping process may be configured to implement control plane functionality to stamp the source identifier on the messages so that host devices may be incapable of implementing the message stamping process (e.g., even when the user escalates administrative privileges or control functionality in the local operating system). The control plane associated with first NIC 410 may store the identifier associated with hardware-validated-matching, which is used during the stamping process, and the functionality of the control plane may be implemented to initiate the stamping process of the identifier on the data packet.

At block 436, first NIC 410 may transmit the identifier with a matching scheme selection bit or bits (e.g., different from the match bit) in a message to second NIC 420. The matching scheme selection bit or bits may identify hardware-validated-matching as the confirmation scheme to be used by the receiver in a reserved portion of the identifier.

At block 440, second NIC 420 may receive the message. A temporary buffer may receive and store the message at second NIC 420. In some examples, packets of the messages are held in temporary storage within the NIC while the system determines the matching scheme to be used and carry out the matching.

At block 442, second NIC 420 may determine that hardware-validated-matching was used by first NIC 410 based on the matching scheme selection bit or bits in the message. Second NIC 420 may identify the format of the message that includes the matching scheme selection bit or bits, as to confirm that that message is in a format that is reserved for the communications from trusted sources. Second NIC 420 may accept communications when the message includes the value and drop/decline any communications that do not comply with the format of the message that includes the matching scheme selection bit or bits and the identifier.

At block 444, second NIC 420 may use a confirmation scheme based on the identification that hardware-validated-matching was used in generating the identifier, similar to block 344. The message may be rejected or passed to higher level software. The higher level software can receive the message when the source of the message cannot be validated. For example, in a client-server application, the server may behave differently according to whether or not it can trust the source of the message.

At block 446, second NIC 420 may add the message to the buffer at second NIC 420 for hardware-validated-matching. For example, the data packet of the message is added to a buffer at second NIC 420 (e.g., for processing) when the source identifier in the buffer matches the source identifier carried in the message.

Figure 5:
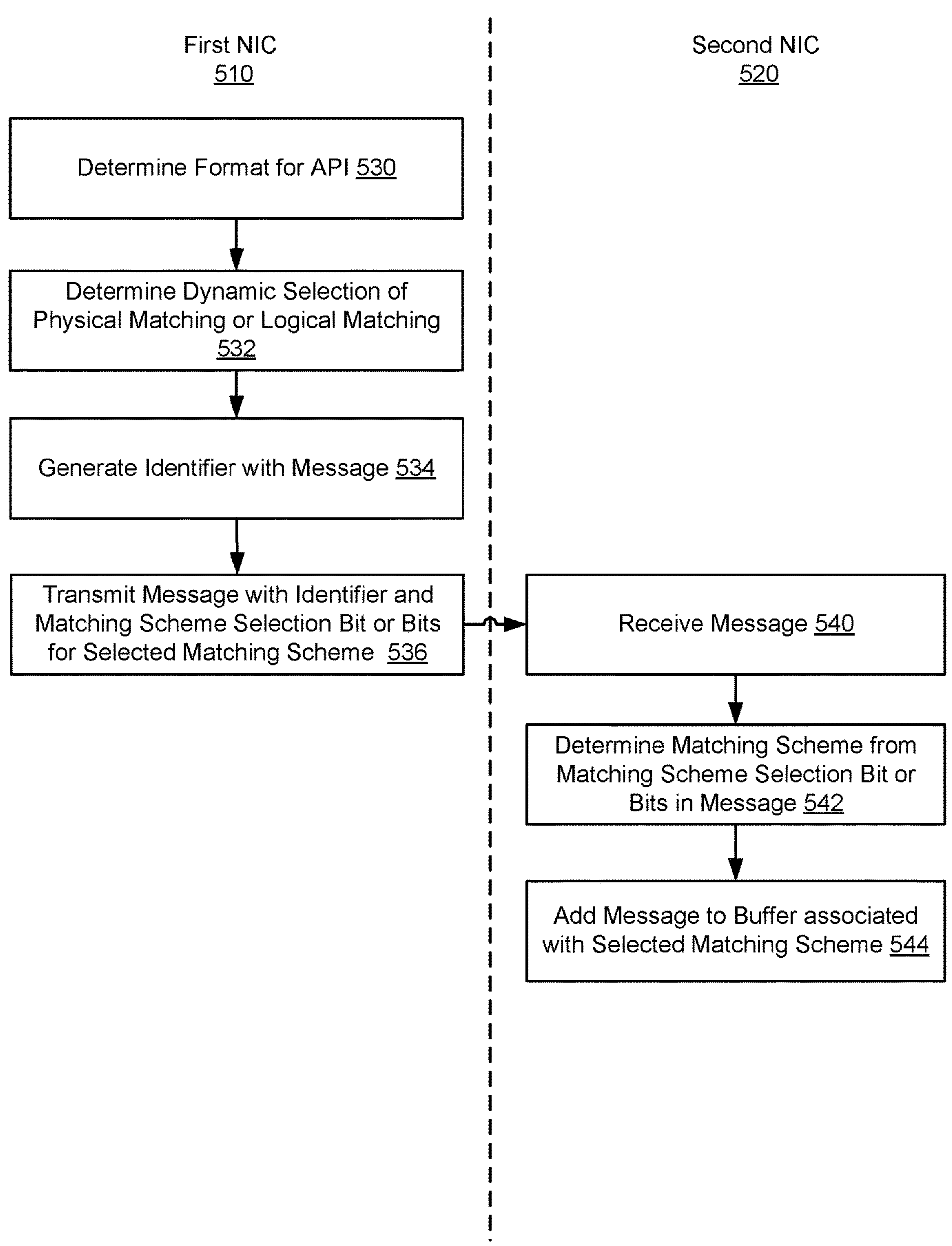
FIG. 5 is an example process for dynamically validating a source identifier and adding a corresponding message to a buffer at a receiver device in accordance with some embodiments of the disclosure.

FIG. 5 illustrates a validation process in a third system environment in accordance with some embodiments of the disclosure. In this example, first NIC 510 and second NIC 520 illustrated in FIG. 5 may correspond with first NIC at client device 130A and second NIC at client device 130B illustrated in FIG. 1, respectively.

At block 530, first NIC 510 may determine a format of the API, similar to block 330.

At block 532, first NIC 510 may determine a dynamic implementation of hardware-validated-matching or software-defined-matching may rely on the client's use of the data center system with respect to customers that use its compute nodes. The system environments may vary based on the intended use of the environment by the client.

In a first system environment, the host device trusts the operating system that is installed from a customer entity. The client may administrate the system and trust the operating system that they installed. This implementation may also trust the host device (hardware) itself that is configured to execute instructions to run the operating system on behalf of the client. The NIC of the host device may implement the message stamping process with respect to the hardware-validated-matching and the operating system can provide the identifier used by the NIC as part of job startup. Since the hierarchy of trust is identified in this environment, the user is permitted to access the communication profile that stores the identifier (e.g., that is stamped to the device as part of the hardware-validated-matching process). In some examples, the operating system may write the identifier to the communication profile through a Critical Section Routine (CSR) (e.g., a section of code for which a process obtains an exclusive lock so that no other process may execute it simultaneously) although use of the communication profile may not be necessary because of the implemented message stamping process.

In a second system environment, the operating system that is installed at the host device from the user is not trusted because the host device hardware may be rented by an unknown user (e.g., in bare metal environment). This type of system may allow the customer to install software on the rented compute nodes. The compute node may include the NIC that is configured with the message stamping process described herein. The system may restrict the OS installed on the devices to read-only access to the communication profile and provide additional security through the message stamping process. Write access may be prohibited to improve the data security of the environment and continue to allow the OS to operate in the environment. The management system programs the source ID for each NIC as part of device or job initialization.

In a third system environment, the physical security in the data center is at risk and each of the communications transmitted in software-defined-matching or hardware-validated-matching may be further encrypted and unreadable by the users in the data center. The data traffic may be encrypted to help prevent accessing the data through physical means. The communication profile and access to other data may be managed as per the zero-trust case discussed above. The settings may remain unchanged by the data center administrator. The users may be permitted to view its own data traffic. Encryption is implemented to protect from a rogue device plugged into the data center system.

At block 534, first NIC 510 may generate an identifier with the message pursuant to selecting hardware-validated-matching or software-defined-matching, similar to blocks 334 and 434.

At block 536, first NIC 510 may transmit the identifier with a matching scheme selection bit or bits in a message to second NIC 520. The matching scheme selection bit or bits may identify the selected matching scheme as the confirmation scheme to be used by the receiver.

At block 540, second NIC 520 may receive the message, similar to block 340.

At block 542, second NIC 520 may determine the matching scheme based on the matching scheme selection bit or bits in the message, similar to block 342 and 442.

At block 544, second NIC 520 may add the message to the buffer at second NIC 520 for the selected matching scheme, similar to block 344 and 446.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 6:
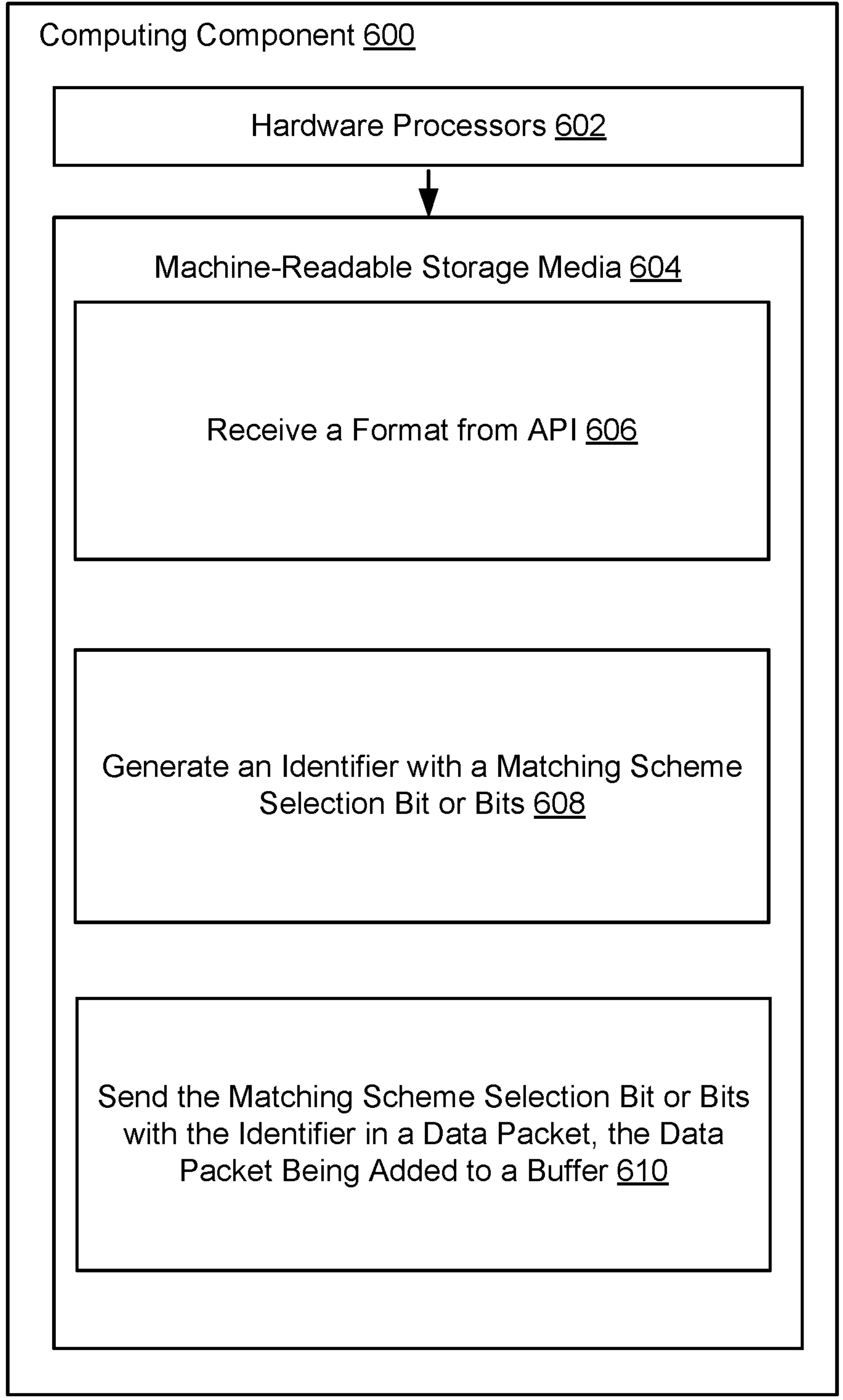
FIG. 6 is an example computing component that may be used to implement various features of embodiments described in the present disclosure.

FIG. 6 illustrates an example computing component that may be used to implement the processes and devices described herein. Referring now to FIG. 6, computing component 600 may be, for example, a server computer, a controller, or any other similar computing component capable of processing data. In the example implementation of FIG. 6, the computing component 600 includes a hardware processor 602 and machine-readable storage medium 604.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-610, to control processes or operations for implementing the dynamically modular and customizable computing systems. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-610.

Hardware processor 602 may execute instruction 606 to receive a format of an API. For example, the format required by the network API of the host device may include a length or character limitation of the identifier corresponding with the sender or source of the message.

Hardware processor 602 may execute instruction 608 to generate an identifier with a matching scheme selection bit or bits. In some examples, the matching scheme selection bit or bits corresponds with a confirmation scheme. In some examples, the format of the source identifier may vary by implementation. For example, the format may limit the incoming message to include a 32-bit identifier. The network API may follow the pre-defined format to define an identifier. A portion of the message format may be reserved to identify the type of matching scheme to implement (e.g., software-defined-matching or hardware-validated-matching) as the matching scheme selection bit or bits and the remaining portion of the message may be reserved for the source identifier associated with the source client device. In other examples, the source identifier is chosen by the customer operating the host device or administrative user of the host device, including by utilizing a logical endpoint identifier (e.g., IP address) and PID, a physical endpoint identifier (e.g., MAC address or network address) and PID, a token that is unique within the scope of the application or service, and an identifier generated using information provided by user software to look up a source identifier or token.

Hardware processor 602 may execute instruction 610 to send the matching scheme selection bit or bits with the identifier from a first NIC to a second NIC. The second NIC may be enabled to add the identifier to a buffer based on the identifier (e.g., the matching scheme selection bit or bits with the identifier or a confirmation scheme used to validate the identifier included in the message). For example, the receiver device may utilize target side buffers that accept the message transmission based on source identifier and traditional packet switching match bits. The message is matched to a buffer at the receiver device that receives the message when the source identifier in the buffer matches the source identifier carried in the message. The receiver device may also identify the matching scheme identifier bit or bits in the received message. The matching scheme identifier bit or bits can identify whether software-defined-matching or hardware-validated-matching is implemented, as well as the identifier associated with the source of the message. The identifier may comprise a hardware-verified bit, a process identifier (PID), and an endpoint identifier (NID).

Figure 7:
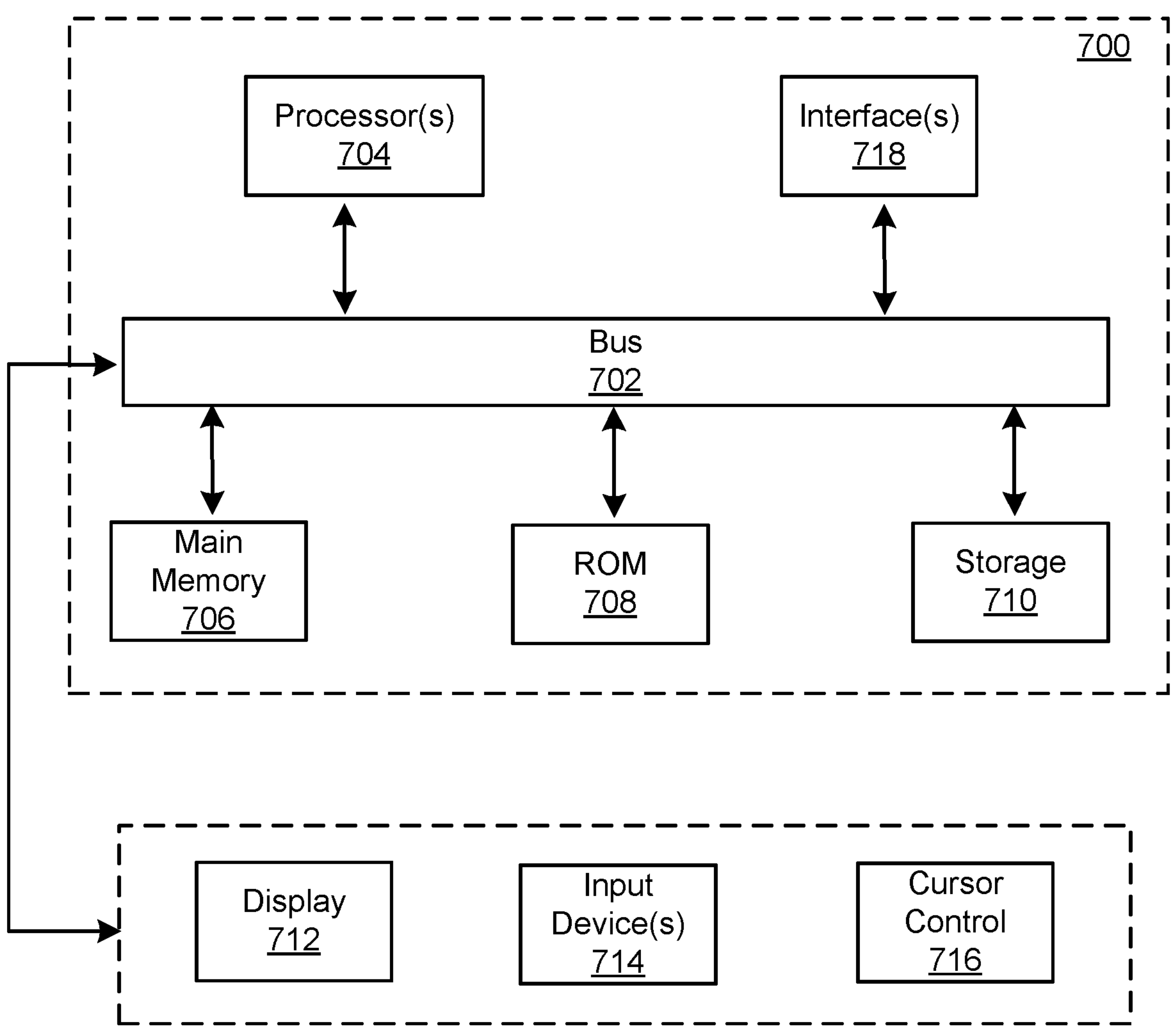
FIG. 7 depicts a block diagram of an example computer system in which various of the embodiments described herein may be implemented.

FIG. 7 depicts a block diagram of an example computer system 700 in which various of the embodiments described herein may be implemented. For example, computer system 700 may correspond with first host 110A or second host 110B or any systems that comprise NIC 120, all of which are illustrated in FIG. 1. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702 that is configured to transmit messages comprising identifiers that are generated from a particular matching scheme implemented at computer system 700 and transmitted to other computer systems, where each computer system may comprise its own NIC, as discussed herein. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A device comprising:

a first network interface card (NIC);

a memory; and a processor configured to execute instructions stored in the memory, wherein the processor is configured to:

receive a first format for an application programming interface (API);

generate, by the first NIC using one of a plurality of matching schemes, an identifier in a second format, wherein the second format of the identifier complies with the first format for the API;

generate a matching scheme selection bit or bits associated with the identifier, wherein the matching scheme selection bit or bits is indicative of the one of a plurality of matching schemes used to generate the identifier;

add the matching scheme selection bit or bits to the identifier, wherein the second format of the identifier remains in accordance with the first format of the API;

send the matching scheme selection bit or bits with the identifier to a receiver device comprising a second NIC; and based on sending the identifier to the second NIC, enabling the second NIC to add the identifier to a buffer at the second NIC based on the identifier and the matching scheme selection bit or bits.

2. The device of claim 1, wherein the matching scheme selection bit or bits is associated with a confirmation scheme, and wherein the second NIC is configured to:

identify the matching scheme selection bit or bits with the identifier as originating from the first NIC of the client device accessible in a control plane with the receiver device;

switch to the confirmation scheme of the identifier that is associated with the matching scheme selection bit or bits; and enable the second NIC to add the data packet to the buffer at the second NIC of the receiver device associated with the confirmation scheme.

3. The device of claim 1, wherein the identifier comprises a source identifier of a user of the first NIC and the matching scheme selection bit or bits, and a length of the identifier fills a data space permitted by the first format of the API.

4. The device of claim 1, wherein a first user of the first NIC is associated with a different identifier than a second user of the first NIC.

5. The device of claim 1, wherein the first format for the API is associated with a framework or abstract of the API.

6. The device of claim 1, wherein the second NIC is embedded with the receiver device and the second NIC is configured to:

stamp the identifier on the data packet.

7. The device of claim 1, wherein the second NIC is configured to:

stamp the identifier on the data packet using control plane functionality.

8. A computer-implemented method comprising:

receiving, at a first network interface card (NIC), a first format for an application programming interface (API);

generating a matching scheme selection bit or bits associated with an identifier, wherein the matching scheme selection bit or bits is indicative of one of a plurality of matching schemes used by the first NIC to generate the identifier;

adding the matching scheme selection bit or bits to the identifier, wherein a second format of the identifier complies with the first format of the API;

sending the matching scheme selection bit or bits with the identifier to a receiver device comprising a second NIC; and based on sending the identifier to the second NIC, enabling the second NIC to add the identifier to a buffer at the second NIC based on the identifier and the matching scheme selection bit or bits.

9. The computer-implemented method of claim 8, wherein the matching scheme selection bit or bits is associated with a confirmation scheme, and the method further comprises:

identifying the matching scheme selection bit or bits with the identifier as originating from the first NIC of the client device accessible in a control plane with the receiver device;

switching to the confirmation scheme of the identifier that is associated with the matching scheme selection bit or bits; and enabling the second NIC to add the data packet to the buffer at the second NIC of the receiver device associated with the confirmation scheme.

10. The computer-implemented method of claim 8, wherein the identifier comprises a source identifier of a user of the first NIC and the matching scheme selection bit or bits, and a length of the identifier fills a data space permitted by the first format of the API.

11. The computer-implemented method of claim 8, wherein a first user of the first NIC is associated with a different identifier than a second user of the first NIC.

12. The computer-implemented method of claim 8, wherein the first format for the API is associated with a framework or abstract of the API.

13. The computer-implemented method of claim 8, wherein the second NIC is embedded with the receiver device and the method further comprises:

stamping the identifier on the data packet.

14. The computer-implemented method of claim 8, wherein the method further comprises:

stamping the identifier on the data packet using control plane functionality.

15. A non-transitory computer-readable storage medium storing a plurality of instructions executable by one or more processors, the plurality of instructions when executed by the one or more processors cause the one or more processors to:

receive, at a receiver device comprising a second network interface card (NIC) and from a first NIC, a message with an identifier that complies with a format for an application programming interface (API);

determine a matching scheme matching scheme used to generate the identifier from a matching scheme selection bit included in the message;

initiate a confirmation scheme associated with the determined matching scheme to validate the identifier in the message; and when the identifier is validated using the confirmation scheme, add the identifier to the to a buffer at the second NIC.

16. The non-transitory computer-readable storage medium of claim 15, wherein the second NIC is configured to:

identify the matching scheme selection bit or bits with the identifier as originating from the first NIC of a client device accessible in a control plane with the receiver device; and switch to the confirmation scheme of the identifier that is associated with the matching scheme selection bit or bits.

17. The non-transitory computer-readable storage medium of claim 15, wherein the identifier comprises a source identifier of a user of the first NIC and the matching scheme selection bit or bits, and a length of the identifier fills a data space permitted by the format of the API.

18. The non-transitory computer-readable storage medium of claim 15, wherein a first user of the first NIC is associated with a different identifier than a second user of the first NIC.

19. The non-transitory computer-readable storage medium of claim 15, wherein the format for the API is associated with a framework or abstract of the API.

20. The device of claim 1, wherein the one of the plurality of matching schemes is a software-defined-matching scheme or a hardware-defined-matching scheme.

* * * * *